Nov. 22, 1938.  E. M. SNOW  2,137,547
MACHINE FOR CHURNING, BEATING, OR MIXING MATERIALS
Filed June 1, 1938  2 Sheets-Sheet 1
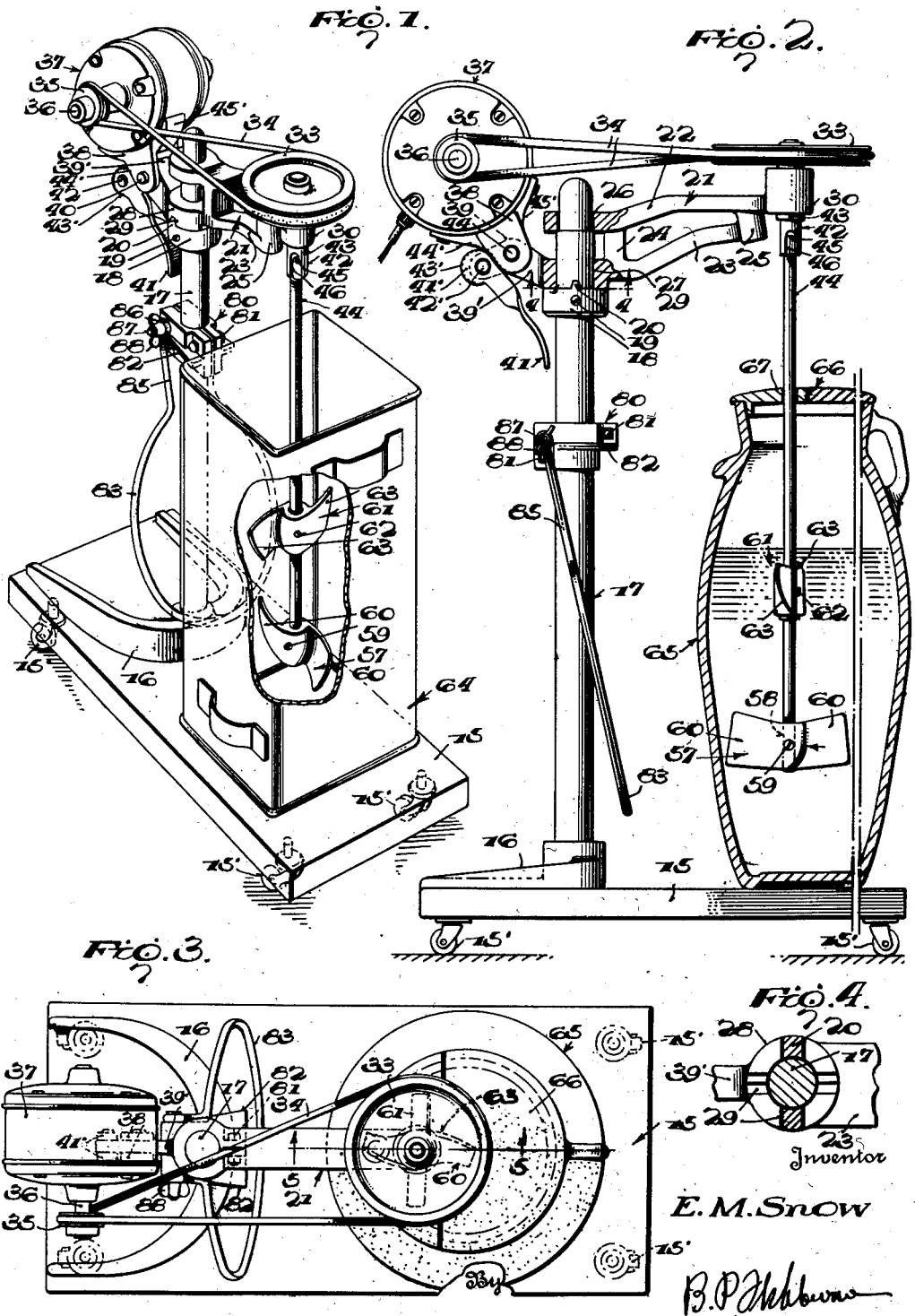
Inventor
E. M. Snow
By B. P. Hibbard
Attorney Nov. 22, 1938.　　　　　E. M. SNOW　　　　　2,137,547
MACHINE FOR CHURNING, BEATING, OR MIXING MATERIALS
Filed June 1, 1938　　　2 Sheets-Sheet 2
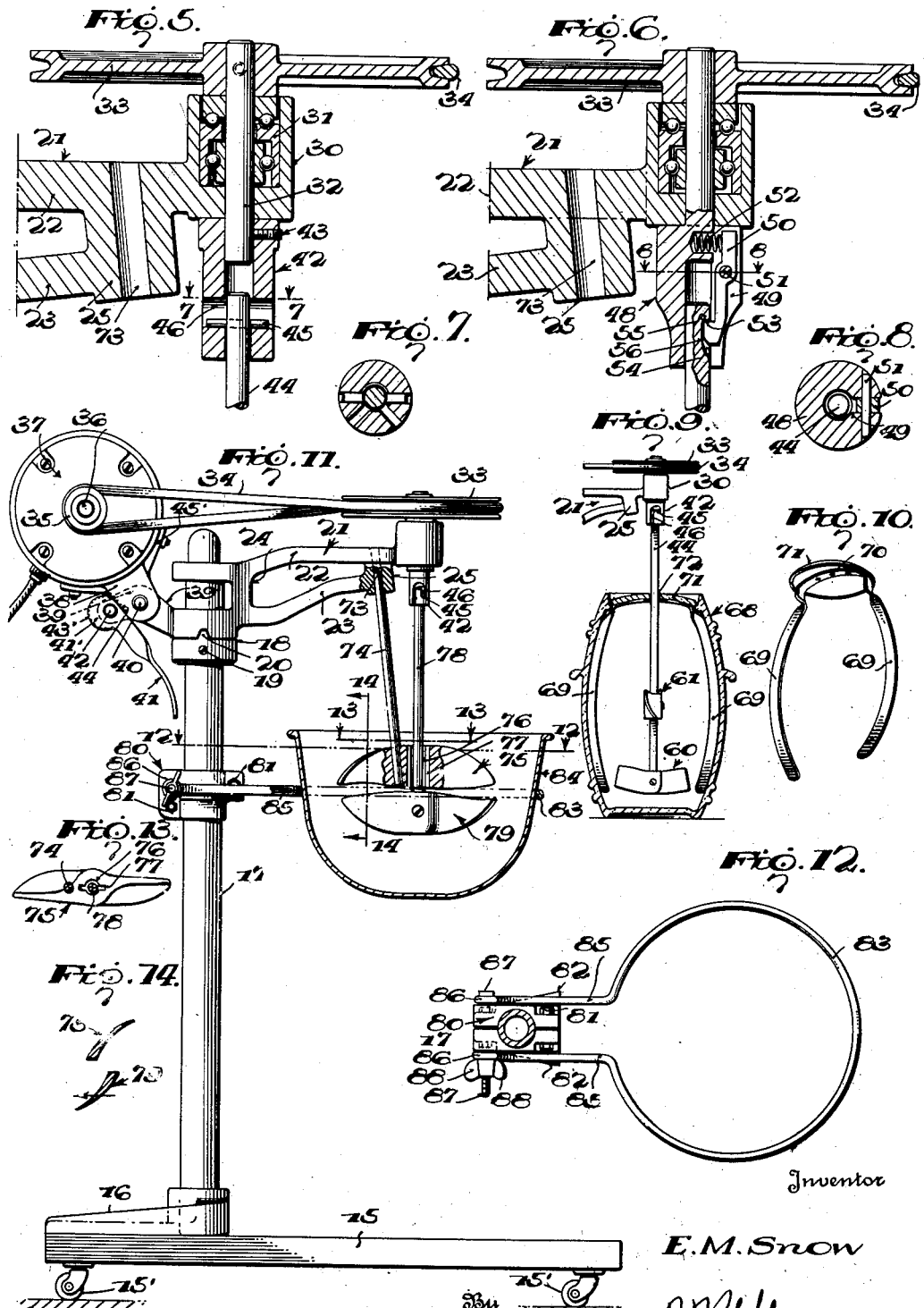
Inventor
E. M. Snow
By B. P. Milbourn
Attorney Patented Nov. 22, 1938

2,137,547

UNITED STATES PATENT OFFICE 2,137,547

MACHINE FOR CHURNING, BEATING, OR MIXING MATERIALS

Ernest M. Snow, Greenville, S. C.

Application June 1, 1938, Serial No. 211,249

12 Claims. (Cl. 259—108)

My invention relates to a machine for churning, beating, or mixing materials.

An important object of the invention is to provide a machine which is well adapted for use in churning butter.

A further object of the invention is to provide a machine of the above mentioned character which is highly efficient in the churning of butter, producing a firm and superior butter, and producing a maximum amount of butter from the milk and which may also be manipulated to gather the butter, after the same is produced.

A further object of the invention is to provide a churn of the above mentioned character, which will operate with the minimum noise, is convenient to manipulate in use, and which may be kept in a proper sanitary condition.

A further object of the invention is to provide dasher blades, so constructed and arranged that one rotary dasher will cause the liquid to travel generally longitudinally within the receptacle, into the path of travel of the other rotary dasher, thus producing a maximum churning action.

A further object of the invention is to provide means for readily separating the dasher rod and the swinging unit, to permit of the removal of the dasher from the churn receptacle.

A further object of the invention is to provide means for opposing the free rotary movement of the mass within the receptacle.

A further object of the invention is to provide means whereby the weight of the motor is employed to retain the belt suitably tight and to balance the apparatus.

A further object of the invention is to provide adjustable means to regulate the extent of movement of the motor in one direction, for controlling the degree of tightness of the belt.

A further object of the invention is to provide a device of the above mentioned character, adapted to serve as a cake beater.

A further object of the invention is to provide interchangeable blades so that the device may be used to churn butter or to mix or beat cake batter or the like.

A further object of the invention is to provide interchangeable means for supporting the milk churn receptacle or the cake batter receptacle.

Other objects and advantages of the invention will be apparent during the course of the following description.

In the accompanying drawings forming a part of this application and in which like numerals are employed to designate like parts throughout the same—

Figure 1 is a perspective view of a machine embodying my invention,

Figure 2 is a side elevation of the same, the receptacle being in section,

Figure 3 is a plan view of the same,

Figure 4 is a horizontal section taken on the line 4—4 of Figure 2,

Figure 5 is a vertical section taken on line 5—5 of Figure 3,

Figure 6 is a similar view showing a modified form of the invention,

Figure 7 is a horizontal section taken on line 7—7 of Figure 5,

Figure 8 is a similar view taken on line 8—8 of Figure 6,

Figure 9 is a central vertical section through a modified form of churn receptacle, showing the brake means in elevation, Figure 10 is a perspective view of the brake means, Figure 11 is a side elevation of a machine embodying a further modification of my invention, and, Figure 12 is a horizontal section taken on line 12—12 of Figure 11.

In the drawings, wherein for the purpose of illustration are shown preferred embodiments of my invention, attention being now called to Figures 1 to 6 inclusive and 11, the numeral 15 designates a horizontal base, preferably mounted upon wheels 15'. A foot 16 is rigidly secured to this base, having a vertical shaft or rod 17 rigidly secured thereto. This shaft or rod is stationary with relation to the base 15 and is preferably cylindrical and is provided at a point near and spaced from its upper end with a collar 18, clamped thereto by a set screw 19 or the like. The collar is therefore vertically adjustable upon the shaft 17. This collar is provided upon its upper face with upwardly projecting teeth or lugs 20, preferably V-shaped. The numeral 21 designates a horizontally swinging arm, including upper and lower bars 22 and 23, connected by webs 24 and 25. The bar 22 has an opening 26, and the bar 23 has an opening 27, both slidably receiving the upper end of the shaft 17, so that the arm 21 may turn horizontally thereon, and be removed therefrom, if desired. Formed integrally with the lower bar 23 is a ring-boss 28, having notches or recesses 29 formed in its lower face, and which are V-shaped, to receive the teeth or lugs 20, thereby holding the arm 21 in the selected adjusted position. The arm 21 is provided at its free end with a sleeve 30, Figures 5 and 6, receiving ball bearings 31, in turn receiving and holding a vertical drive shaft 32.

Rigidly secured to the upper end of the vertical drive shaft 32 is a horizontal grooved pulley 33, engaged by a quarter turned belt 34, engaging a vertical grooved pulley 35. The pulley 35 is the smaller and is rigidly secured to one end of a horizontal armature shaft 36 of a horizontally arranged motor 37. The motor is provided upon the lower portion of its periphery with knuckles 38, which are spaced, to receive therebetween a knuckle 39, formed upon an arm 39', integral with the ring boss 28. The knuckle 39 of the arm 39' is pivoted to the knuckles 38 by a horizontal pin 40. It is thus seen that the pin 40 is arranged beneath the armature shaft 36 of the motor and the center of gravity of the motor is well upon the forward side of the same, whereby the motor will tend to swing downwardly from the shaft 17. It will be noted that the motor is arranged upon one side of the shaft 17 and the pulley 33 and associated elements are disposed upon the opposite side of the shaft 17, whereby the parts of the apparatus are balanced. The numeral 41 designates an adjusting lever, the free end of which is forked to provide sides 41', pivoted to the outer end of the arm 39' which extends outwardly beyond the knuckle 39, as shown at 42'. The sides 41' have cam or eccentric faces 43', which are preferably knurled, to engage with a preferably knurled face 44', formed upon the mounting 45' of the knuckles 38. It is thus seen that by adjusting the lever 41, the cam faces 43' may be brought into engagement with the face 44', and hence the extent of swinging movement of the motor from the pulley 33 may be varied. The weight of the motor regulates the tension upon the belt 34, and hence by regulating the tension upon the belt, due to varying degrees of slippage, a single speed motor may be employed to drive the shaft 32 at different speeds.

As more clearly shown in Figure 5, a tubular coupling 42 is rigidly secured to the shaft 32 by a set screw 43, and this tubular coupling is adapted to receive the upper end of a cylindrical dasher rod 44, carrying a transverse pin 45. This transverse pin is adapted for insertion within inverted U-shaped slots 46, formed in the tubular coupling 42. The U-shaped slots have their closed ends arranged elevated and their open ends lowermost. By passing the dasher rod upwardly through the tubular coupling, the pin 45 will travel through the slots 46, and by slightly turning the dasher rod and then lowering the same, the dasher rod will be locked to the tubular coupling, for rotation therewith. By a reverse manipulation of these parts, the dasher rod may be readily separated from the coupling.

In Figure 6, I have shown a modified form of connection between the drive shaft 32 and the dasher rod 44. In Figure 6, a tubular coupling 48 is preferably formed integral with the shaft 32 and is provided with a longitudinal slot 49, in which is mounted a latch 50, pivoted at 51, and moved in one direction by a spring 52. This latch has a slightly upwardly hooked end 53, to enter a groove 54 in the dasher rod. This groove has a shoulder 55 and an inclined face 56. When the dasher rod is passed upwardly into the tubular coupling 48, the hooked end 53 will engage within the groove 54 beneath the shoulder 55, and the dasher rod will be held against downward movement and will also rotate with the coupling 48. To disconnect these parts, the dasher rod 44 is moved upwardly and the hooked end 53 will engage the inclined face 56 and pass out of the groove 54, subsequently to which the dasher rod may be turned, so that the groove will be out of alignment with the hooked end 53, and the dasher rod can then be moved entirely out of the coupling 48.

In both forms of the invention thus far described, the dasher rod 44 is equipped with a lower dasher element 57, having an opening 58 to receive the rod 44 and the dasher element is clamped to this rod by a set screw 59. The dasher element includes blades 60, which are generally horizontal and longitudinally curved or inclined in the direction of rotation of the dasher element. These blades are also transversely or vertically curved and inclined. By virtue of the curvature and inclination of the blades 60, they serve to cause the liquid to travel generally upwardly in the path of travel of a second rotary dasher element. This second dasher element is designated by the numeral 61, and is clamped to the rod 44 by a set screw 62, and may be vertically adjusted upon the rod. The dasher element 62 embodies blades 63, which are horizontal, longitudinally straight, and vertically inclined, as shown. These blades serve to throw the liquid radially outwardly and the blades 63 are preferably arranged at a right angle to the blades 60. In Figure 1, the numeral 64 designates a receptacle mounted upon the base 15 to receive the milk or other liquid, and in which the dasher elements operate. This receptacle is preferably square, rectangular or polygonal, the purpose of the square receptacle being to brake or oppose the free rotary action of the liquid.

I also contemplate using a receptacle 65, Figure 2, in place of the receptacle 64. The receptacle 65 is circular in horizontal cross section and is disposed eccentric with respect to the dasher rod 44. I have found that this eccentric arrangement of the receptacle brakes the free rotary movement of the liquid, and dispenses with the necessity of using vanes or brakes. The receptacle 65 is provided with a lid 66, formed in sections, one section having an opening 67 for the rod 44, the other section may be readily removed for inspecting the material.

I also find that satisfactory results are obtainable by using a receptacle 68, circular in cross section and arranged concentric with respect to the dasher rod 44. When this is done, I use braking elements or vanes 69, to be arranged within the receptacle and extending longitudinally thereof throughout its entire length. The transverse dimensions of the vanes 69 extend radially of the receptacle 68. The vanes 69 are secured to a resilient strap 70, attached to a cover 71, having an opening 72 for the rod 44.

In each form of the invention, the web 25 is shown as provided with a socket 73. This socket is adapted to removably receive the upper end of a stationary dasher rod 74, to the lower end of which is rigidly and preferably permanently attached an upper stationary dasher element 75. This dasher element 75 is provided at its center with a cylindrical opening 76, and radial slots 77. The numeral 78 designates a rotary dasher rod identical with the rod 44, but shorter, and adapted for insertion within the coupling 42 and equipped with the same transverse pin 45. The opening 76 receives the rotary dasher rod 78 and the slots 77 permit of the passage of the pin 45. A dasher element 79 is rigidly secured to the lower end of the dasher rod 78 and is arranged beneath the dasher element 75. The dasher element 79 is preferably identical or similar to the dasher element 61 and is adapted to elevate the batter or other material. The dasher element 75 is similar to the dasher element 79 but is inverted with relation thereto so that its action will tend to force the batter downwardly. The pressure of the batter acting against the dasher elements will tend to separate them. The cylindrical opening 76 is larger than the diameter of the dasher rod 78, to permit of slight play, when the dasher rods 78 and 74 are both shifted upwardly slightly, in removing the rotary dasher rod 78 from within its socket 42.

The numeral 80 designates a two-part clamp which is vertically adjustable upon the shaft 17 and held thereto by bolts 81. This clamp carries horizontal flanges 82 upon its opposite sides. The numeral 83 designates a ring or hoop to support a pan or receptacle 84 holding the batter and this hoop has radial arms 85, spaced as shown, for arrangement upon opposite sides of the clamp 80. The arms 85 have eyes 86 at their free ends, to be pivotally mounted upon a bolt 87 secured to the clamp and this bolt carries a thumb nut 88. When the arms 85 are horizontally arranged, they engage above the flanges 82 and are supported thereby. When desired, by loosening the thumb nut 88, the arms 85 may be shifted outwardly sufficiently so that they clear the flanges 82, at which time the hoop 83 may be shifted to the lowered position, Figures 1 and 2.

The operation of the invention shown in Figures 1 to 7 inclusive is as follows:

With the parts adjusted, as shown in Figures 1 and 2, the pivoted motor automatically retains the belt 34 sufficiently taut, and the tension of the belt may be regulated by adjusting the lever 47. This motor drives the pulley 33, dasher rod, and dasher. The dashers are rotating counter-clockwise in Figure 1. Since the blades of the lower dasher are transversely inclined upwardly from the direction of rotation, and longitudinally curved or inclined in the direction of rotation, they scoop up the liquid, to a certain extent, and force it upwardly, into the path of travel of the blades 63 of the upper dasher. The blades 63 are longitudinally straight but are transversely inclined vertically upwardly toward the direction of rotation, and hence tend to retard the upward movement of the liquid and throw the same radially outwardly. The square shape of the receptacle, Figure 1, retards the free rotation of the liquid. When the receptacle 65, Figure 2, is used, which is circular and eccentric, the eccentricity retards the free rotation of the liquid. When the receptacle 68 is used, Figure 9, with the brakes 69, these brakes retard the free rotation of the liquid. It is to be understood that the same machine is used in connection with either of the receptacles 64, 65 or 68. By adjusting the lever 47, the motor may be swung to somewhat slacken the belt, allowing slippage, thus slowing down the dashers, thereby gathering the butter into a mass. After the churning has been completed, the dasher rod 44 is disconnected from the coupling, and arm 21 swung to a position to one side of the receptacle, thus permitting of the removal of the dasher rod from the receptacle. The teeth 20 hold the arm 26 against accidental displacement, but permit of the horizontal turning movement of the arm, when desired.

When the machine is to be used for mixing or beating cake batter or the like, the milk receiving receptacles are removed and the hoop or support 83 shifted to the horizontal position, and held in such position by the flanges 82, Figures 11 and 12. The dasher rod 44 is not used in connection with the device shown in Figures 11 and 12. The assembled dasher elements 75 and 79 and dasher rods 74 and 78 are now used. The dasher rod 74 has its upper end inserted into the socket 73 while the dasher rod 78 is inserted into the socket 42, and locked therein. The batter is placed in the receptacle 84. The dasher element 79 rotating clockwise, Figures 11 and 14, and having its leading faces inclined upwardly away from its direction of rotation, tends to raise the batter, while the dasher element 75 being stationary, and having its engaging faces inclined upwardly in a reverse direction to the direction of rotation of the batter, tends to urge the batter downwardly, and the batter exerts pressure upon these dasher elements, tending to separate them. The dasher elements are separable from each other, as is obvious.

This application is a continuation in part of my copending application for Machine for churning, beating or mixing materials, filed August 2, 1937, Serial No. 157,036, allowed November 12, 1937.

It is to be understood that the forms of my invention herewith shown and described are to be taken as preferred examples of the same and that various changes in the shape, size and arrangement of parts, may be resorted to, without departing from the spirit of the invention or the scope of the subjoined claims.

Having thus described my invention, what I claim is:

1. A machine for churning, beating or mixing materials, comprising an upstanding support, a horizontally swinging arm pivotally mounted between its ends upon the support, a drive shaft permanently secured to the arm near one end of the arm and having a socket, a pulley mounted upon the drive shaft, a motor mounted upon the arm near the opposite end of the arm, a pulley driven by the motor, a belt connecting the pulleys, a dasher rod having detachable connection with the socket to enter a receptacle, and a dasher operated by the dasher rod, the arrangement being such that the arm may be swung from over the receptacle when separated from the dasher rod to permit of the convenient removal of the dasher rod.

2. A machine for churning, beating or mixing materials, comprising an upstanding support, a horizontally swinging arm pivotally mounted between its ends upon the support and projecting radially beyond the support, a receptacle arranged upon one side of the support beneath the arm, the arm being adapted to be swung to a position upon one side of the receptacle, a pulley mounted upon the arm near one end of the arm, a dasher rod to enter the receptacle, means for detachably connecting the dasher rod and pulley, a dasher carried by the dasher rod, a motor mounted upon the arm near the opposite end of the arm and having an armature shaft, a pulley mounted upon the armature shaft, and a belt connecting the pulleys.

3. A machine for churning, beating or mixing materials, comprising an upstanding support, a horizontally swinging arm pivotally mounted between its ends upon the support and projecting laterally beyond the support, the arm being adapted to assume a position upon one side of the support over a receptacle thereon and to be swung to a position from over the receptacle, a pulley mounted upon the arm near one end of the arm, a dasher rod to enter the receptacle, means for detachably connecting the dasher rod and pulley, a dasher carried by the dasher rod, a motor pivotally mounted upon the arm near the opposite end of the arm to swing vertically and having an armature shaft, a pulley mounted upon the armature shaft, and a belt connecting the pulleys, the motor swinging in one direction to regulate the tension of the belt.

4. A machine for churning, beating or mixing materials, comprising an upstanding support, a horizontally swinging arm pivotally mounted between its ends upon the support and projecting laterally beyond the same, a receptacle arranged upon one side of the support beneath the arm, the arm being shiftable to a position upon one side of the receptacle, a pulley carried by one end of the arm, a dasher rod to enter the receptacle, means for detachably connecting the dasher rod and pulley, a dasher carried by the dasher rod, a motor pivotally connected with the opposite end of the arm at a point upon one side of its armature shaft so that the motor tends to swing in one direction, a pulley secured to the armature shaft, and a belt connecting the pulleys.

5. A machine for churning, beating or mixing materials, comprising an upstanding support, a horizontally swinging arm pivotally mounted upon the support, a pulley arranged upon one side of the support and mounted upon the arm, a motor having an armature shaft arranged upon the opposite side of the support, means pivotally mounting the motor upon the arm and having a turning axis arranged to one side of the armature shaft and next to the support so that the motor swings from the pulley, a pulley mounted upon the armature shaft, a belt connecting the pulleys, a dasher device for connection with the first named pulley.

6. A machine for churning, beating or mixing materials, comprising an upstanding support, a horizontally swinging arm pivotally mounted upon the support, a pulley mounted upon one side of the support and mounted upon the arm, a motor mounted upon the opposite side of the support, means to pivotally mount the motor upon the arm and having a turning axis arranged upon one side of the armature of the motor and next to the support, a pulley mounted upon the armature shaft, a belt connecting the pulleys, an adjustable element to limit the swinging movement of the motor from the first named pulley, and a dasher device connected with the first named pulley.

7. A machine for churning, beating or mixing materials, comprising an upstanding support, a horizontally swinging arm pivotally mounted upon the support, a pulley mounted upon the arm, a motor having an armature shaft, means pivotally mounting the motor upon the arm and having a turning axis disposed upon one side of the armature shaft so that the motor swings from the pulley, an adjustable cam pivoted upon the arm and having a milled part to engage with a milled part of the motor, a pulley mounted upon the armature shaft, a belt connecting the pulleys, and a dasher device connected with the first named pulley.

8. A churn comprising a substantially vertical support, a horizontally swinging arm mounted upon the support and projecting upon one side of the same, a receptacle arranged upon one side of the support beneath the arm, driving means mounted upon the arm, a dasher rod detachably connected with the driving means and extending into the receptacle, a dasher carried by the dasher rod, a cover for the receptacle having an opening for the passage of the dasher rod, a generally U-shaped resilient element secured to the cover, and including braking arms adapted to be passed into the receptacle and to engage with the inner side thereof, the arrangement being such that the horizontally swinging arm may be swung to a position to one side of the receptacle so that the cover and dasher may be removed.

9. A machine for churning, beating or mixing materials, comprising a generally horizontal support, a rotary driving element carried by the generally horizontal support, an upstanding dasher rod detachably connected with the rotary driving element, a dasher carried by the rotary dasher rod to rotate therewith, a non-rotary dasher disposed near and above the rotary dasher and having an opening formed therein for receiving the rotary dasher rod, the rotary dasher and the non-rotary dasher being substantially concentric, and a second upstanding rod secured to the non-rotary dasher and detachably connected with the generally horizontal support, the rotary dasher serving to limit the downward movement of the upper non-rotary dasher and the second upstanding rod serving to hold the non-rotary dasher against rotation, the non-rotary dasher and its rod being capable of limited vertical movement with respect to the rotary dasher, so that the non-rotary dasher may be moved upwardly slightly due to the action of the rotating material and retained thereby out of contact with the rotary dasher.

10. A machine for churning, beating or mixing material, comprising a support having a generally vertical socket, a rotary driving element mounted upon the support, a generally vertical rotary dasher rod detachably connected with the rotary driving element, a rotary dasher mounted upon the rotary dasher rod, a non-rotary dasher mounted above the rotary dasher and having an opening for the passage of the rotary dasher rod, the lower rotary dasher serving to limit the downward movement of the upper non-rotary dasher, a generally vertical second rod secured to the non-rotary dasher and removably inserted within the generally vertical socket and serving to hold the non-rotary dasher against rotation, the rotary dasher and non-rotary dasher being adapted to be moved downwardly as a unit prior to their removal as a unit.

11. A machine for churning, beating or mixing material, comprising a generally horizontal support, a rotary driving element mounted upon the generally horizontal support, a generally vertical rotary dasher rod connected with the rotary driving element, a rotary dasher secured to the dasher rod, a non-rotary dasher arranged upon one side of the rotary dasher and having an opening for the passage of the rotary dasher rod, and an upstanding rod secured to the non-rotary dasher and connected with the generally horizontal support.

12. A machine for churning, beating or mixing materials, comprising a generally horizontal support having a generally vertical socket, a rotary driving element carried by the generally horizontal support, an upstanding dasher rod detachably connected with the rotary driving element, a generally horizontal dasher blade carried by the rotary dasher rod, a non-rotary generally horizontal dasher blade disposed near and above the rotary dasher blade and having an opening for receiving the rotary dasher rod, the generally horizontal dasher blades being pitched in opposite directions with relation to each other, and a second upstanding rod secured to the non-rotary dasher blade and adjustably and removably mounted in the generally vertical socket, the rotary dasher blade serving to limit the downward movement of the upper non-rotary dasher blade and the action of the rotary dasher blade upon the material serving to move the upper non-rotary dasher blade from the same.

ERNEST M. SNOW.